(No Model.) 4 Sheets—Sheet 2.
H. F. E. GERIKE.
PENDULUM SCALE.
No. 267,073. Patented Nov. 7, 1882.
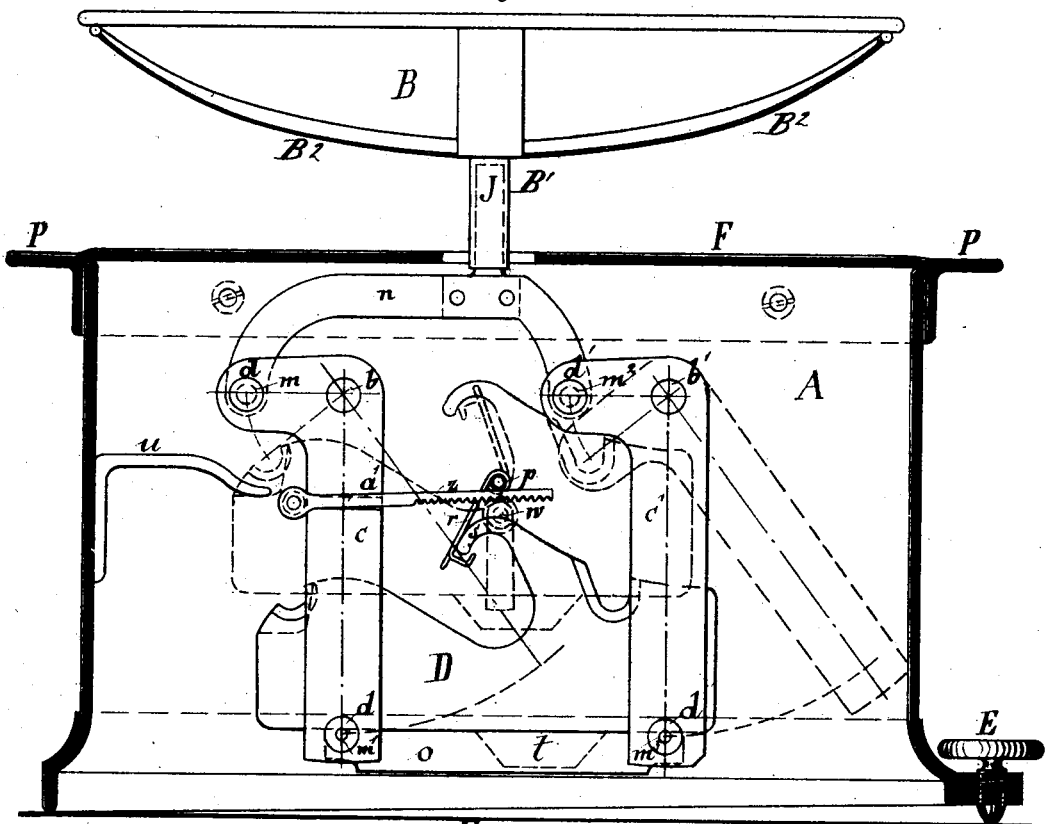
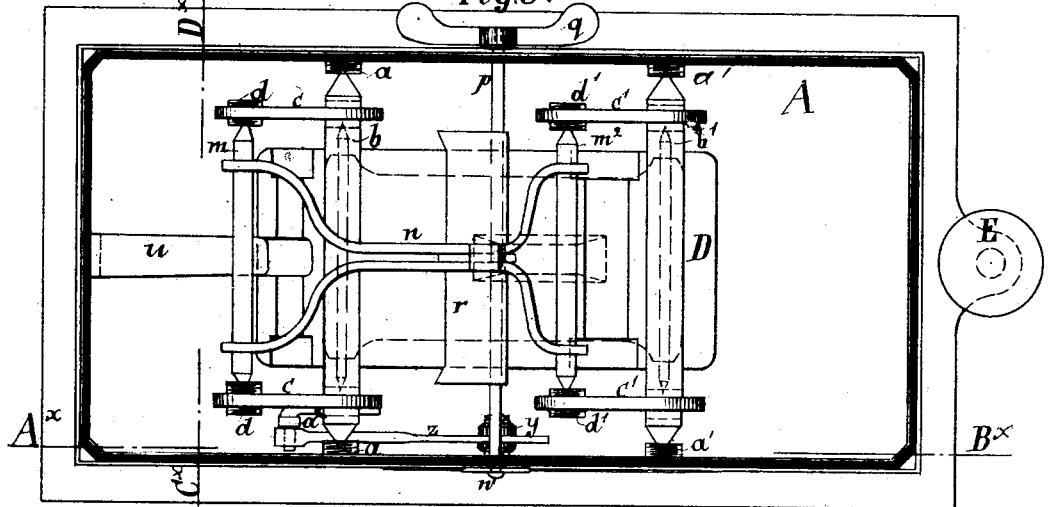
Witnesses
Inventor
Hugo F. E. Gerike
by Paul Goepel
Attorney (No Model.)  H. F. E. GERIKE.  4 Sheets—Sheet 3.
PENDULUM SCALE.
No. 267,073.  Patented Nov. 7, 1882.
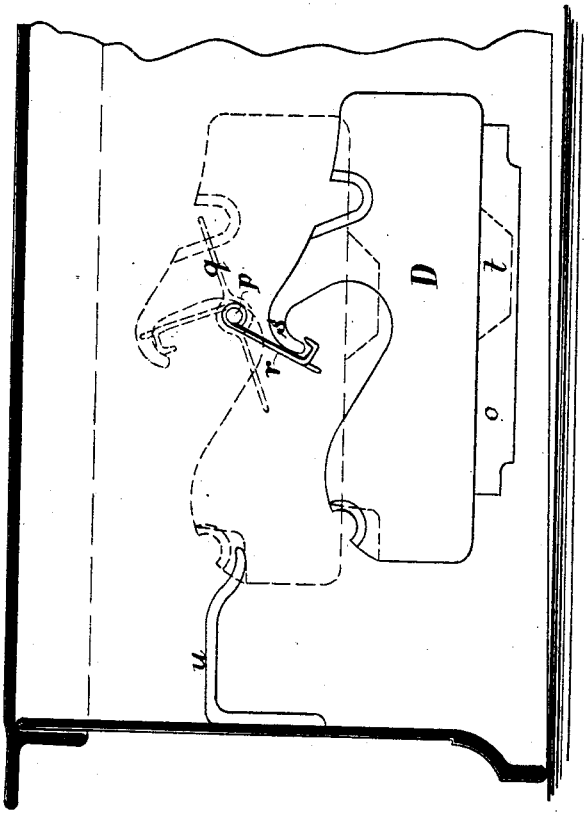
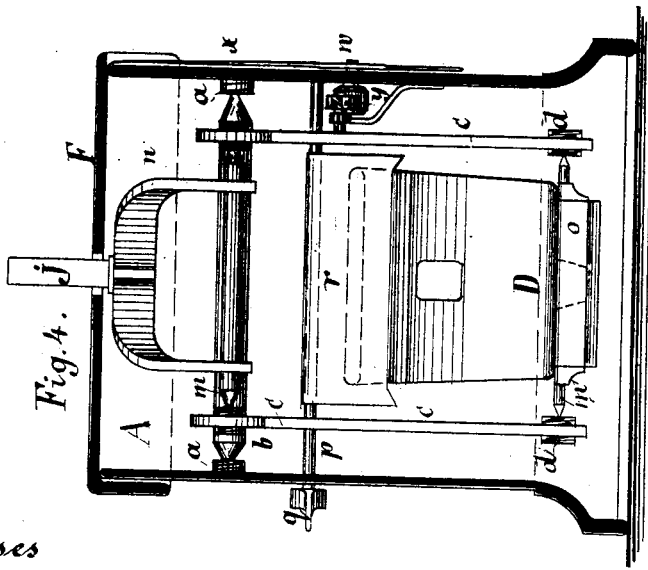

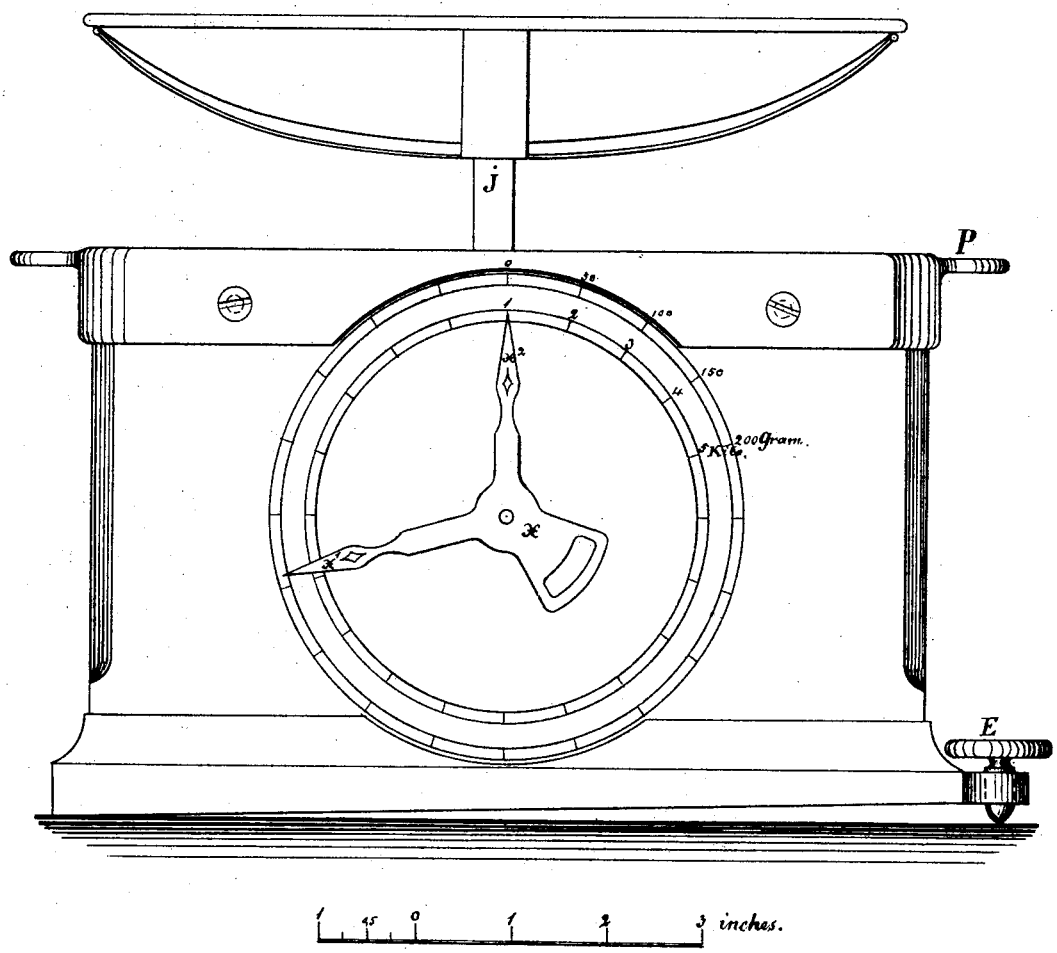

(No Model.)   H. F. E. GERIKE.   4 Sheets—Sheet 4.
PENDULUM SCALE.

No. 267,073.   Patented Nov. 7, 1882.

Witnesses  Inventor

UNITED STATES PATENT OFFICE.

HUGO F. E. GERIKE, OF BERLIN, GERMANY.

PENDULUM-SCALE.

SPECIFICATION forming part of Letters Patent No. 267,073, dated November 7, 1882.

Application filed August 2, 1882. (No model.)

*To all whom it may concern:*

Be it known that I, HUGO F. E. GERIKE, of Berlin, Prussia, in the Empire of Germany, have invented certain new and useful Improvements in Scales, of which the following is a specification.

This invention has reference to improvements in scales which work with a variable balance-weight, and in which a double dial can be made use of, so that the weighing of larger and smaller quantities may be accurately determined.

The invention consists of two pairs of fulcrumed elbow-levers which carry, by a connecting-bridge at their upper part, the scoop, while the lower part carries on a connecting weighted plate a weight, that can be raised therefrom by suitable mechanism, according as the scale is used for weighing larger or smaller quantities. When the balance-weight is supported in raised position it is retained in steady position by suitable mechanism, as will be more fully described hereinafter.

Figure 6:
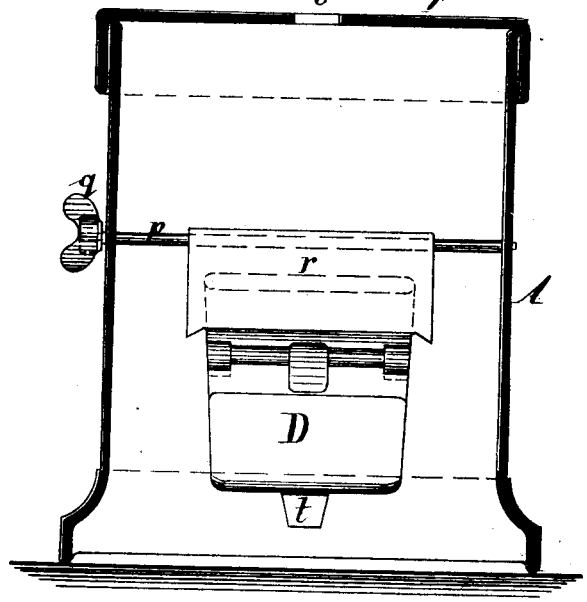
Figure 7:
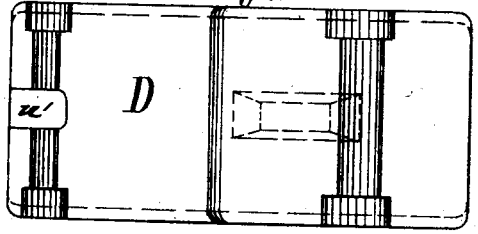

In the accompanying drawings, Figure 1 represents a side elevation of my improved scales. Fig. 2 is a vertical longitudinal section on line $A^x B^x$, Fig. 3. Fig. 3 is a plan view with the top plate removed. Fig. 4 is a vertical transverse section on line $C^x D^x$, Fig. 3. Fig. 5 is a detail view of the counter-weight and the mechanism for lifting and retaining it in raised position. Fig. 6 is an end view of the balance-weight, and Fig. 7 a detail plan of the same.

Similar letters of reference indicate corresponding parts.

My improved scales are inclosed in a metallic casing or box, A, which is closed by a top plate, F, screwed or otherwise fastened thereto. The side walls of the casing A support the transverse shafts $b\ b'$, the conically-tapering ends of which turn in conically-recessed bearings $a\ a'$; or they may be supported on knife-edges, or in any other approved manner. Each shaft $b\ b'$ carries two elbow-levers, $c\ c$ and $c'\ c'$, which are keyed to the shafts at their angles in such a manner that the longer arms extend downward, while the shorter arms extend backward from the shafts. The upper and lower ends of the elbow-levers $c\ c$ and $c'\ c'$ are provided with conically-recessed bearings $d\ d$ and $d'\ d'$, which serve to support transverse shafts $m\ m'$ $m^2\ m^3$, which shafts have conically-tapering ends. These shafts may, however, also be supported on knife-edge supports. The upper transverse connecting-shafts, $m\ m^2$, are connected by a forked bridge, $n$, the ends of which are fitted loosely to the shafts $m\ m^2$. This bridge carries a vertical pin, J, that extends through an opening in the top plate, F, said opening serving to receive the bottom socket, B', of the scoop B.

To the lower transverse shafts, $m'\ m^3$, is applied a weighted plate, $o$, which turns loosely on said shafts, and which forms the balance-weight for the scoop B when the scales are used for weighing lighter articles. When larger quantities have to be weighed on the scale a balance-weight, D, (shown in Figs. 2, 3, 4, 5, and 6,) of peculiar shape is used, which is readily raised or lowered by suitable mechanism, so as to be either placed in position on the weighted plate $o$ or raised above the same, as required. This weight D is provided at its middle portion with an upwardly-extending hook-shaped portion, and in front of the same and at the rear end with transverse recesses, into which the arms of the elbow-levers $c\ c\ c'$ $c'$ and their transverse shafts $m\ m^2$ swing when the weight is raised, so that it cannot interfere with the motion of the weighted plate $o$.

The mechanism for raising or lowering the weight D consists of a transverse shaft, $p$, which is provided with an exterior crank-handle, $q$, and inside of the casing A with a hook-shaped arm, $r$, that extends transversely across the full width of an upwardly-extending hook, $s$, of the weight D, so that in turning the shaft $p$ the hook $r$ passes below the hook $s$, and raises thereby the weight by the turning of the shaft $p$, as shown in dotted lines in Figs. 2 and 5. In the lowermost position of the weight D the same is supported directly by the weighted plate $o$, upon which it is retained and prevented from shifting by means of a bottom projection, $t$, which enters into a recess of corresponding shape of the plate $o$. When the weight D is lifted into raised position by means of the hooks $r$ and $s$ it is entirely disconnected from the scale mechanism and protected against oscillatory motion by means of a fixed arm, $u$, secured to the end wall of the casing A, which arm engages a recess, $u'$, at the rear part of the weight D, as shown clearly in Figs. 2 and 5.

The extent of swinging motion of the elbow-levers $c\ c$ and $c'\ c'$ is transmitted to the pointer, which indicates the weight in the following manner: To the outer end of the shorter pointer-shaft $w$ is applied a double pointer of angular shape, and on the inner end of the same the pinion $y$, with which meshes a rack, $z$, that is pivoted at the outer end to one of the elbow-levers $c$, at $a^2$. By the oscillating motion of the elbow-levers $c\ c\ c'\ c'$ the rack $z$ is moved over the pinion, so that the double pointer $x$ is moved along a double dial at the outside of the casing A, as shown in Fig. 1, so as to indicate thereby the weight of the articles placed in the scoop B in pounds, kilograms, and other units of measure.

When the weight D is in its highest position and out of connection with the operating mechanism the weighted plate $o$ forms the balance-weight, so that weights of less than pounds, kilograms, or other equivalent can be indicated on the second dial by the longer arm $x'$ of the double pointer $x$, which admits the accurate reading off of the weights of smaller quantities. If, however, the weight D is resting on the plate $o$, the shorter arm $x^2$ of the double pointer $x$ indicates the weight on the interior dial. The distance between the arms $x'\ x^2$ of the double pointer has to be such that when the weight D is on the plate $o$ the finger $x^2$ will be at the zero-point, and when said weight is hung up the finger $x'$ will be at said point. For properly adjusting the double pointer $x$ to zero on the dials, a set-screw, E, is arranged at one end of the casing A, whereby said casing can be accurately adjusted into horizontal position.

The scoop B is supported in curved radial arms of the socket B'. These arms prevent the tilting of the scoop when the same is unequally acted upon by the article to be measured.

The top plate, F, of the casing A is provided with a handle, P, at either end, by which the scales can be readily taken hold of and moved from place to place.

If desired, the dials may be made in different colors and the arms of the tapering pointer colored correspondingly, so that the dials and pointer-arms belonging to each other can be more readily recognized, and thereby the reading of the weight facilitated.

The advantages of my improved scales are that the actuating mechanisms are hung to six points, so as to work regularly, and by the use of the weighted plate alone, or in connection with the weight D, can be used with a variable balance-weight. The use of the variable balance-weight admits the use of the scales for reading off larger and smaller articles on the double dial, whereby the scope of the scales is considerably enlarged.

Having thus described my invention, I claim as new and desire to secure by Letters Patent—

1. The combination of two or more pairs of laterally connected and fulcrumed elbow-levers, $c\ c\ c'\ c'$, with transverse shafts $m\ m'\ m^2\ m^3$, scoop-carrying bridge $n$, connecting the upper shafts, $m\ m^2$, and a weighted balance-plate, $o$, connecting the lower shafts, $m'\ m^3$, of the elbow-levers, substantially as set forth.

2. The combination of the oscillating elbow-levers $c\ c\ c'\ c'$, means for supporting said levers, the transverse shafts $m\ m^2$, the bridge connecting said shafts, the scoop B, supported on said bridge, the transverse shafts $m'\ m^3$, connecting the lower ends of said levers, a weighted plate, $o$, supported on said shafts, a larger weight, D, adapted to rest on said plate, and mechanism whereby the same can be raised or lowered, so as to use the scales with a variable balance-weight, substantially as set forth.

3. The combination of the oscillating elbow-levers $c\ c\ c'\ c'$, suitable supports therefor, connecting-bridge $n$, carrying-scoop B, weighted plate $o$, balance-weight D, having upwardly-extending hook $s$, transverse shaft $p$, having hook $r$, and fixed arm $u$, entering into a recess, $u'$, of the balance-weight D, substantially as and for the purpose set forth.

4. The combination of the oscillating and weighted elbow-levers $c\ c\ c'\ c'$, suitable supports for said levers, pivoted rack $z$, shaft $w$, having interior pinion, $y$, and an exterior double pointer, $x$, and a double dial at the outside of the casing A, substantially as specified.

5. The combination of the oscillating elbow-levers $c\ c\ c'\ c'$, suitable supports therefor, the bridge $n$, balance-scoop B, weighted plate $o$, balance-weight D, mechanism for raising and lowering the balance-weight, shaft $w$, mechanism for transmitting the oscillating motion of the elbow-levers to said shaft, and the double pointer $x$, the arms of which are arranged at such a distance from each other that the arms $x'\ x^2$ are set to the zero-points of their respective dials, according as the scale mechanism is used with or without the vertically-adjustable weight, substantially as and for the purpose set forth.

In testimony that I claim the foregoing as my invention I have signed my name in the presence of two subscribing witnesses.

HUGO FERDINAND EMIL GERIKE.

Witnesses:
 JOHANNES BRANTZ,
 HUGO WILOP.